United States Patent
Yun et al.

(10) Patent No.: US 12,549,931 B2
(45) Date of Patent: Feb. 10, 2026

(54) MESSAGE HOP-BASED COMMUNICATION METHOD AND APPARATUS FOR GUARANTEEING REAL-TIME COMMUNICATION IN AN AUTONOMOUS DRIVING ENVIRONMENT

(71) Applicants: Penta Security Inc., Seoul (KR); Autocrypt Co., Ltd., Seoul (KR)

(72) Inventors: Keon Yun, Seoul (KR); Jin Hyeok Oh, Gwangmyeong-si (KR); Sun Woo Yun, Goyang-si (KR); Sang Min Lee, Seoul (KR); Myong Cheol Lim, Seoul (KR); Tae Gyun Kim, Yongin-si (KR); Sang Gyoo Sim, Seoul (KR); Duk Soo Kim, Seoul (KR); Eui Seok Kim, Seoul (KR)

(73) Assignees: Penta Security Inc., Seoul (KR); Autocrypt Co., Ltd., Seoul (KR)

( * ) Notice: Subject to any disclaimer, the term of this patent is extended or adjusted under 35 U.S.C. 154(b) by 374 days.

(21) Appl. No.: 18/148,301

(22) Filed: Dec. 29, 2022

(65) Prior Publication Data

US 2024/0224010 A1    Jul. 4, 2024

(30) Foreign Application Priority Data

Dec. 28, 2022    (KR) ........................ 10-2022-0188028

(51) Int. Cl.
*H04W 4/44* (2018.01)
*G01C 21/00* (2006.01)

(52) U.S. Cl.
CPC .......... *H04W 4/44* (2018.02); *G01C 21/3841* (2020.08)

(58) Field of Classification Search
CPC .......... H04W 4/44; H04W 4/80; H04W 4/46; H04W 4/40; H04W 88/04; G01C 21/3841; G08G 1/164; G08G 1/163; G08G 1/0112; H04B 1/713
See application file for complete search history.

(56) References Cited

U.S. PATENT DOCUMENTS

| 12,058,593 B2 | 8/2024 | Yun et al. |
| 2015/0312883 A1 | 10/2015 | Han et al. |
| 2019/0029148 A1 | 1/2019 | Han et al. |
| 2019/0088041 A1 | 3/2019 | Lee et al. |

(Continued)

FOREIGN PATENT DOCUMENTS

| GB | 2592277 A | * | 8/2021 | .............. H04W 4/40 |
| KR | 20100070164 A | * | 6/2010 | ........... G08G 1/0965 |

(Continued)

*Primary Examiner* — Ayaz R Sheikh
*Assistant Examiner* — Louis Samara
(74) *Attorney, Agent, or Firm* — BROADVIEW IP LAW, PC (57) ABSTRACT

A message hop-based communication method of guaranteeing real-time communication in a vehicle communication environment may comprise: receiving, by a first on-board unit (OBU) of a first vehicle, a first message including a message frame (MF) for probe vehicle data (PVD) from a road side unit (RSU); and transmitting a second message, including an MF for a basic safety message (BSM), to a second OBU of a second vehicle, the second message corresponding to the first message, wherein the PVD and the BSM each comprise a data frame for a hopping request.

19 Claims, 5 Drawing Sheets

(56) References Cited

U.S. PATENT DOCUMENTS

| | | | | |
|---|---|---|---|---|
| 2019/0306677 A1* | 10/2019 | Basu | ................... | G08G 1/0112 |
| 2020/0021960 A1* | 1/2020 | Hwang | .............. | G06Q 10/0635 |
| 2020/0026290 A1 | 1/2020 | Lim | | |
| 2020/0028736 A1* | 1/2020 | Park | ..................... | H04W 72/23 |
| 2020/0066157 A1* | 2/2020 | Feifel | ................... | G08G 1/163 |
| 2021/0076184 A1 | 3/2021 | Lee et al. | | |
| 2021/0314843 A1 | 10/2021 | Yang et al. | | |
| 2022/0144283 A1* | 5/2022 | Li | ................... | G08G 1/096758 |
| 2023/0262070 A1* | 8/2023 | Myara | ................... | H04W 12/45 |
| | | | | 726/22 |

FOREIGN PATENT DOCUMENTS

| | | | | | |
|---|---|---|---|---|---|
| KR | 10-2014-0074782 | A | | 6/2014 | |
| KR | 10-2017-0091288 | A | | 8/2017 | |
| KR | 10-2019-0032090 | A | | 3/2019 | |
| KR | 10-2151649 | B1 | | 9/2020 | |
| KR | 10-2021-0028971 | A | | 3/2021 | |
| KR | 10-2244241 | B1 | | 4/2021 | |
| KR | 10-2256273 | B1 | | 5/2021 | |
| KR | 10-2021-0063497 | A | | 6/2021 | |
| KR | 20210063497 | A | * | 6/2021 | ............ B60W 30/14 |
| KR | 2022062755 | A | * | 5/2022 | |
| KR | 10-2412276 | B1 | | 6/2022 | |
| WO | WO-2018179282 | A1 | * | 10/2018 | ............... G08G 1/01 |
| WO | 2020/022526 | A1 | | 1/2020 | |
| WO | WO-2021012668 | A1 | * | 1/2021 | ............. H04W 4/44 |

* cited by examiner

MESSAGE HOP-BASED COMMUNICATION METHOD AND APPARATUS FOR GUARANTEEING REAL-TIME COMMUNICATION IN AN AUTONOMOUS DRIVING ENVIRONMENT

CROSS-REFERENCE TO RELATED APPLICATIONS

This application claims priority to Korean Patent Application No. 10-2022-0188028 filed on Dec. 28, 2022 in the Korean Intellectual Property Office (KIPO), the entire contents of which are hereby incorporated by reference.

BACKGROUND

1. Technical Field

Example embodiments of the present disclosure relate to a message hop-based communication method and apparatus for guaranteeing real-time communication in an autonomous driving environment.

2. Related Art

An intelligent transport system (ITS) is a transportation system in which advanced information and communication technology is applied to transportation means and facilities such as automobiles and roads to improve traffic flow and safety.

In line with the recent promotion and distribution of the ITS, the development of technologies and related services for autonomous vehicles, connected cars, shared transportation services, etc. are actively being prepared.

Meanwhile, in the ITS, it is currently impossible for a central traffic center to share traffic situation information generated in communication impossible areas. In particular, sharing and handling of accident information identified by vehicles outside a sensor detection range of a smart transportation infrastructure are insufficient. Accordingly, blind spots where traffic conditions cannot be checked may occur, and the stability of all traffic situations may decrease due to a significant delay in a response to or an inappropriate response to unexpected situations in the blind spots.

SUMMARY

Accordingly, example embodiments of the present disclosure are provided to substantially obviate one or more problems due to limitations and disadvantages of the related art.

Example embodiments of the present disclosure provide a message hop-based communication method and apparatus for guaranteeing real-time communication in a vehicle communication environment, in which communication based on a hopping method is used to share information about accidents occurring in areas, in which communication cannot be established with a base station or a road side unit (RSU), in real time between vehicles or with a central traffic center.

Example embodiments of the present disclosure also provide a message hop-based communication method and apparatus for guaranteeing real-time communication in a vehicle communication environment, in which information about the state of an autonomous vehicle located in a communication impossible area is supported to be shared with an RSU.

Example embodiments of the present disclosure also provide a message hop-based communication method and apparatus for guaranteeing real-time communication in a vehicle communication environment, in which vehicle-to-vehicle (V2V) communication is actively used and message specifications for sharing the V2V communication with an RSU are used.

A message hop-based communication method, according to an aspect of the present disclosure for resolving the above-described technical objective, may comprise: receiving, by a first on-board unit (OBU) of a first vehicle, a first message including a message frame (MF) for probe vehicle data (PVD) from a road side unit (RSU); and transmitting a second message, including an MF for a basic safety message (BSM), to a second OBU of a second vehicle, the second message corresponding to the first message, wherein the PVD and the BSM each comprise a data frame for a hopping request.

The data frame for the hopping request may comprise a data element for a hopping RSU identifier (ID) and a data element for a hopping vehicle ID, wherein the hopping RSU ID and the hopping vehicle ID may be used to identify a message transmitter and a message receiver. The data frame for the hopping request may further comprise a data element for a hopping message ID, wherein the hopping message ID may be used to identify a message transmitted between the message transmitter and the message receiver or a driving negotiation session corresponding to the message.

The data frame for the hopping request may further comprise at least one among data elements for a hopping traffic accident (hopping_DriveAccident), a hopping time stamp (hopping_timestamp), a hopping longitude (hopping_Longitude), a hopping latitude (hopping_Latitude), a hopping elevation (hopping_Elevation), or a hopping positional accuracy (hopping_positionalAccuracy).

The first message or the second message may be transmitted through an IEEE 802.11p interface or an IEEE 802.11g interface.

The PVD may further comprise a date frame for BSM core data (BSMCoreData).

The BSM may further comprise a data frame for a full position vector (FullPositionVector).

A message hop-based communication apparatus, according to another aspect of the present disclosure for resolving the above-described technical objective, may comprise: a memory storing specifications for a message frame, a data frame included in the message frame, and data elements included in the data frame; and a processor connected to the memory and configured to control transmission and reception of messages according to the specifications. The processor may be further configured to: receive a first message including a message frame for probe vehicle data (ProbeVehicleData (PVD)) from a road side unit (RSU); and transmit a second message, including a message frame for a basic safety message (BSM), to a second communication node, the second message corresponding to the first message, wherein the PVD and the BSM each comprise a data frame for a hopping request.

The first communication node may be located near the second communication node and may be at least a part of a first vehicle located in an area in which communication is capable of being established with the RSU, and the second communication node may be at least a part of a second vehicle located in an area in which communication is not capable of being established with the RSU.

The first message may be broadcast from the RSU to the first vehicle to check information about the second vehicle.

The second message may comprise a hopping request message extracted from the first message.

The processor may be further configured to receive, from the second communication node, a third message in which a requested information value of the hopping request message in the second message is included by the second communication node.

The processor may be further configured to transmit a fourth message including the hopping request message extracted from the third message to the RSU.

The fourth message may further comprise a data element including information identifying the RSU, which is a transmitter of the first message, a data element including information identifying either the second communication node, which is a receiver of the second message, or a second vehicle corresponding to the second communication node, and a data element including information identifying either a message between the RSU and the second communication node or a driving negotiation session.

The first message may comprise information in which a data element value of a message ID (MsgID) in a hopping request message is set to a first specific value, a data element value of an RSU ID (rsuID) is set to a second specific value, and a data element value of a vehicle ID is set to null.

A message hop-based communication method, according to yet another aspect of the present disclosure for resolving the above-described technical objective, may comprise: receiving a first message including a message frame for probe vehicle data (ProbeVehicleData (PVD)) from a road side unit (RSU); and transmitting a second message, including a message frame for a basic safety message (BSM), to a second communication node, the second message corresponding to the first message, wherein the PVD and the BSM each comprise a data frame for a hopping request.

The first message may be a message broadcast from the RSU to the first communication node to check information about the second communication node, and the second message may comprise a hopping request message extracted from the first message.

The message hop-based communication method may further comprise: receiving, from the second communication node, a third message in which a requested information value of the hopping request message in the second message is included by the second communication node.

The message hop-based communication method may further comprise: transmitting a fourth message including a hopping request message extracted from the third message to the RSU. The fourth message may comprise a data element including information identifying the RSU, which is a transmitter of the first message, a data element including information identifying either the second communication node, which is a receiver of the second message, or a second vehicle corresponding to the second communication node, and a data element including information identifying either a message between the RSU and the second communication node or a driving negotiation session.

The first communication node may be located near the second communication node and may be at least a part of a first vehicle located in an area in which communication is capable of being established with the RSU, and the second communication node may be at least a part of a second vehicle located in an area in which communication is not capable of being established with the RSU.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
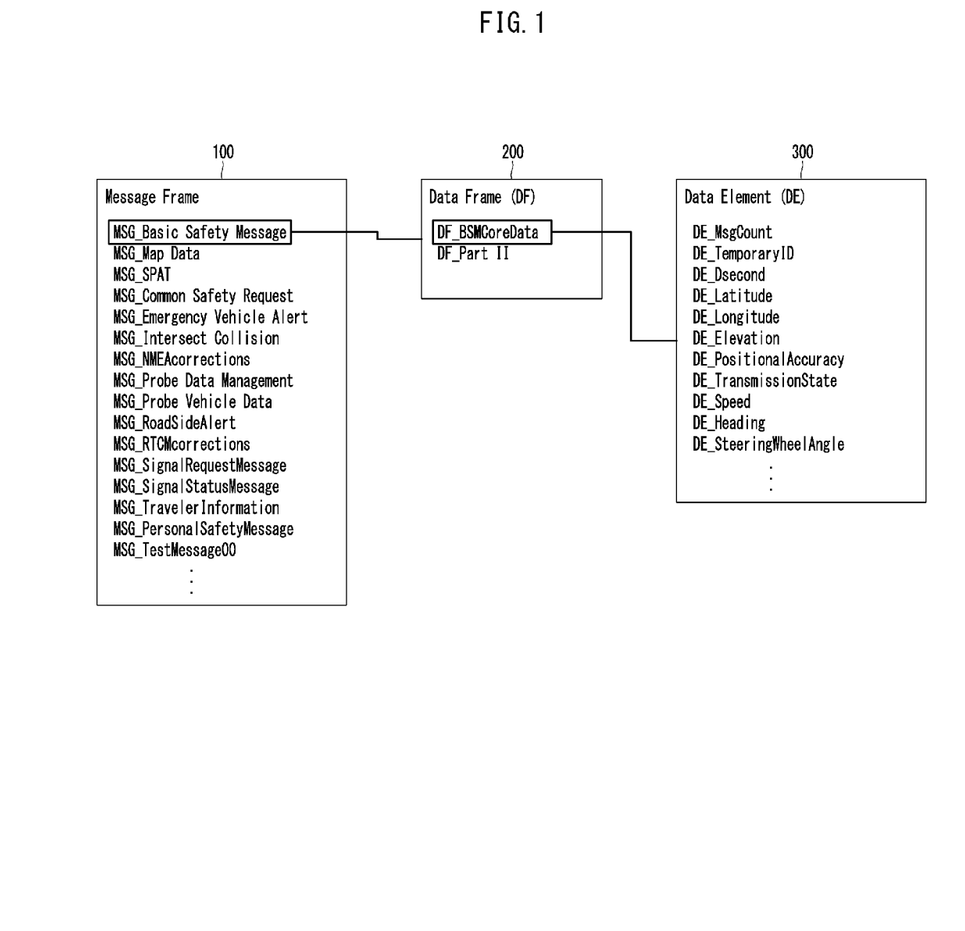
FIG. 1 is a conceptual diagram for describing a message specification that may be employed in a message hop-based communication method (hereinafter referred briefly to as a 'communication method') for guaranteeing real-time communication in an autonomous driving environment according to an embodiment of the present disclosure.

FIG. 1 is a conceptual diagram for describing a message specification that may be employed in a message hop-based communication method (hereinafter referred briefly to as a 'communication method') for guaranteeing real-time communication in an autonomous driving environment according to an embodiment of the present disclosure.

Referring to FIG. 1, a message specification applicable to the communication method of the present embodiment may include a message set according to the SAE J2735 standard. The SAE J2735 standard defines a message set for vehicle-to-vehicle (V2V) communication or vehicle-to-infrastructure (V2I) communication in a cooperative intelligent transport systems (C-ITS) environment.

The message set of the standard includes a message frame 100, a data frame (DF) 200, and a data element (DE) 300 as components.

The message frame 100 may basically include about thirty basic message specifications, such as an MSG_basic safety message, MSG_map data, MSG_SPAT, an MSG_common safety request, an MSG_emergency vehicle alert, an MSG_intersect collision, MSG_NMEA corrections, MSG_probe data management, MSG_probe vehicle data, an MSG_RoadSideAlert, MSG_RTCM corrections, an MSG_SignalRequestMessage, an MSG_SignalStatusMessage, MSG_TravelerInformation, an MSG_PersonalSafetyMessgae, an MSG_TestMessage, etc., according to message type. Each message frame may include one or more DFs.

The DF 200 may include two or more DEs. The DF 200 may include DF_BSMCoreData, DF_Part II, and the like.

The DE 300 is a minimum data specification. Examples of the DE 300 may include basic DEs, such as DE_MsgCount, DE_TemporaryID, DE_Dsecond, DE_Latitude, DE_Longitude, DE_Elevation, DE_PositionalAccuracy, DE_TransmissionState, DE_Speed, DE_Heading, and DE_SteeringWheelAngle.

As described above, in the communication method of the present embodiment, a message specification of the SAE J2735 standard is extended to simply perform V2V communication and V2I communication in a message hop manner. The extension of the message specification takes the form of adding a hopping request message to be described below, but the hopping request message should be understood to mean a method of using a message hop and thus may be replaced with another term or expression.

Figure 2:
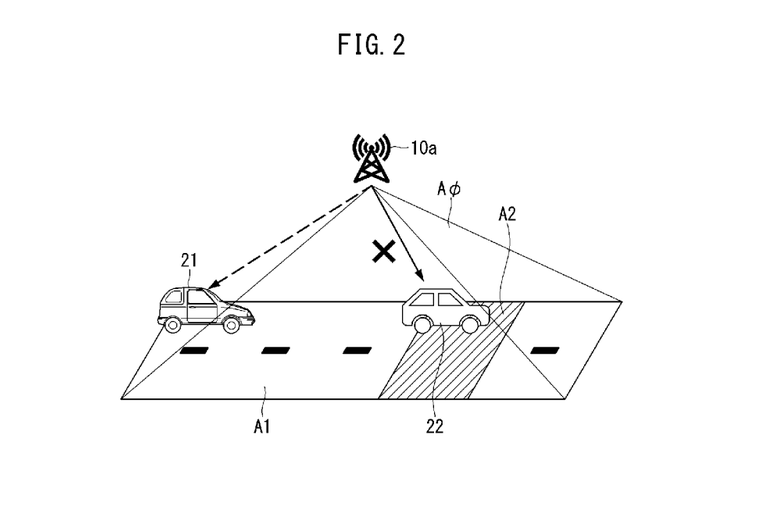
FIG. 2 is a diagram for describing a traffic situation of a comparative example in which the message specification of FIG. 1 is not applied.
Figure 3:
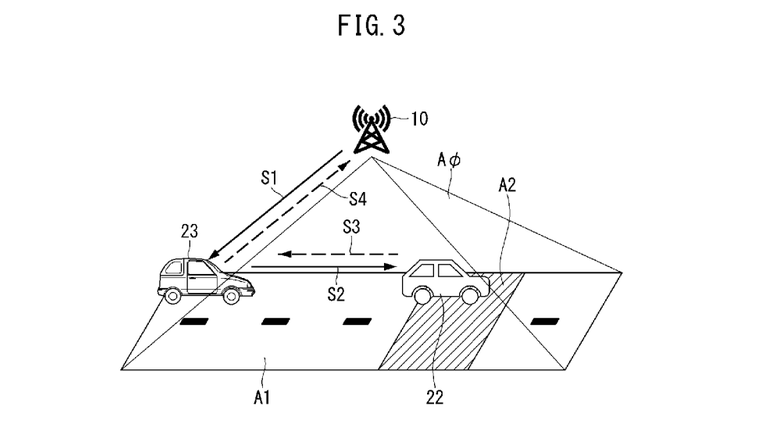
FIG. 3 is a diagram for describing an example of a traffic situation to which the message specification of FIG. 1 is applied.

FIG. 2 is a diagram for describing a traffic situation of a comparative example in which the message specification of FIG. 1 is not applied. FIG. 3 is a diagram for describing an example of a traffic situation to which the message specification of FIG. 1 is applied.

Referring to FIG. 2, an RSU 10a includes a certain coverage A0 and communicates with vehicles in the coverage A0. However, the RSU 10a is an RSU of the comparative example and does not use a hopping request message. Therefore, the RSU 10a is capable of communicating with a first vehicle 21 located in a communication possible area A1 but is not capable of communicating with a second vehicle 22 located in a communication impossible area A2. The communication impossible area A2 may be caused by an external environment, such as a building or a tunnel, or a specific partial defect of the second vehicle 22.

Referring to FIG. 3, an RSU 10 of the present embodiment may transmit a first communication message S1 including a first hopping request message to a first vehicle 22, which is located near a second vehicle 22 and located in a communication possible area A1, to obtain information about the second vehicle 22 located in a communication impossible area A2. When the first vehicle 23 and the second vehicle 22 are capable of using hopping request messages, the first vehicle 23 may include the first hopping request message extracted from the first communication message S1 in a second communication message S2 and transmit the second communication message S2 to the second vehicle 22. In this case, the second vehicle 22 may include an information request value included in the first hopping request message in a second hopping message and transmit a third communication message S3 including the second hopping message to the first vehicle 23. Thereafter, the first vehicle 23 may transmit a fourth communication message, including an RSU identifier included in the first hopping request message, an RSU identifier included in the second hopping request message, a second vehicle identifier, and a corresponding message identifier, to the RSU 10.

According to the configuration of the first to fourth communication messages S1 to S4 described above, the RSU 10 may perform message hop-based real-time communication with the second vehicle 22 located in the communication impossible area A2.

Figure 4:
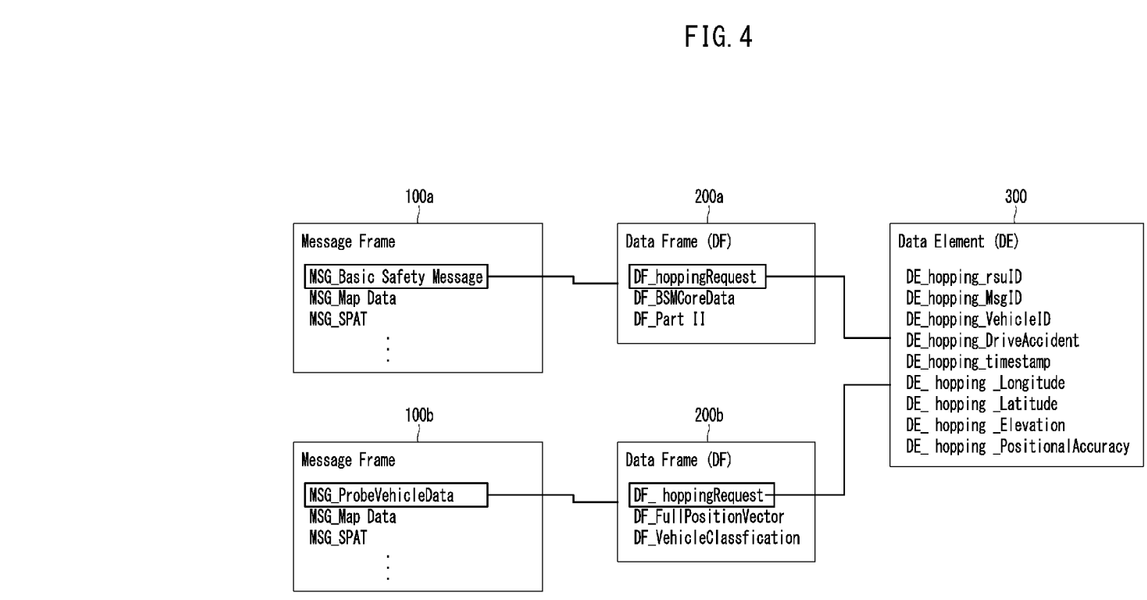
FIG. 4 is a diagram illustrating an example of a message specification for describing a communication method according to an embodiment of the present disclosure.

FIG. 4 is a diagram illustrating an example of a message specification for describing a communication method according to an embodiment of the present disclosure.

Referring to FIG. 4, the message specification may be in a form defined by adding a new message to a message standard of the Society of Automotive Engineers (SAE) J2735 standard.

Messages transmitted and received between a base station or an RSU and an on-board device of a vehicle or between a first vehicle and a second vehicle may include a message frame (MF), a DF included in the MF, and a DE included in the DF.

Examples of the MF include a basic safety message MSG_Basic Safety Message, which is a message MSG including basic safety information, a message MSG_Map Data including map data, a message MSG_SPAT including lane information, a message MSG_ProbeVehicleData including probe vehicle information, etc. Some MFs 100a may be defined or used for the transmission and reception of messages between a second communication node and a third communication node. Some other MFs 100b may be defined or used for the transmission and reception of messages between a first communication node and the second communication node.

In the communication method of the present embodiment, a hopping request message, which is a new message, may be defined as DFs 200a and 200b included in a certain MF. The hopping request message may be expressed as "DF_hoppingRequest" in a certain MF.

In particular, the hopping request message DF_hoppingRequest may be defined in an MF of the probe vehicle information message MSG_ProbeVehicleData (PVD) and transmitted between the first communication node and the second communication node. Alternatively, the hopping request message DF_hoppingRequest may be defined in an MF of the basic safety message MSG_Basic Safety Message (BSM) and transmitted between the second communication node and the third communication node.

The first communication node may be a base station or an RSU, the second communication node may be a general vehicle or an autonomous vehicle located in an area in which communication with a base station or an RSU is performable, and the third communication node may be a general vehicle or an autonomous vehicle located in an area in which communication with a base station or an RSU is not performable.

That is, according to a configuration of the present embodiment, a BSM may include a DF of a hopping request message and may be used for V2V communication, and a PVD message may include the DF of the hopping request message and may be used for V2I communication.

The DF of the hopping request message may define at least one DE 300. The DFs 200a and 200b of the hopping request message may include a DE for the hopping RSU ID hopping_rsuID and a DE for a hopping vehicle ID hopping_VehicleID. The hopping RSU ID hopping_rsuID and the hopping vehicle ID hopping_VehicleID may be used to identify a message transmitter and a message receiver.

In addition, the DFs 200a and 200b of the hopping request message may further include a DE for the hopping message ID hopping_MsgID. The hopping message ID may be used to identify a message transmitted between a message transmitter and a message receiver.

The DFs 200a and 200b of the hopping request message may further include at least one among DEs for a hopping traffic accident hopping_DriveAccident, a hopping time stamp hopping_timestamp, a hopping longitude hopping_Longitude, a hopping latitude hopping_Latitude, a hopping elevation hopping_Elevation, and a hopping positional accuracy hopping_positionalAccuracy.

The PVD message described above may be transmitted through an IEEE 802.11p interface. The BSM may be transmitted through an IEEE 802.11g interface. The PVD message may be referred to as a first message, and the BSM message may be referred to as a second message.

According to the configuration of the present embodiment, a hopping request message is defined as a certain DF included in a V2V message or a V2I message, so that real-time communication between vehicles or between a vehicle and an infrastructure may be ensured by a message hop method through the DEs included in the hopping request message.

As described above, according to the present embodiment, a communication method in different MFs may be provided. Moreover, real-time communication implemented in the form of an RSU, a first vehicle, and a second vehicle may be supported by the communication method.

In other words, in conventional methods, a message specification used for communication between an RSU and a vehicle is different from that used for communication between vehicles, and thus it is not possible to transmit desired information from a certain RSU to a first vehicle and transmit the necessary information from the first vehicle to a second vehicle. This is because a structure of a DF included in a PVD message specification and a structure of a DF included in a BSM message specification are different from each other. That is, the PVD message has a structure including a DF DF_BSMCoreData for BSM core data and a DF DF_Part II for part II, but the BSM message has a structure including a DF DF_FullPositionVector for full position vectors and a DF DF_Vehicle Classification for vehicle classification.

Meanwhile, in the present embodiment, a hopping request message, which is a common DF of a certain MF, is defined for a smooth message hop for communication between an RSU and a vehicle and communication between vehicles. Desired information may be exchanged in real time between V2V and V2I communication nodes through the DF of the hopping request message. In particular, for communication between a second vehicle in a communication impossible area and a first vehicle in a communication possible area, a DF of a hopping request message may be configured to define DEs such as an RSU identification value, a latitude, and a longitude, and real-time communication may be established between the first vehicle and the second vehicle through the DF to share information about a traffic situation or an accident in the communication impossible area.

Figure 5:
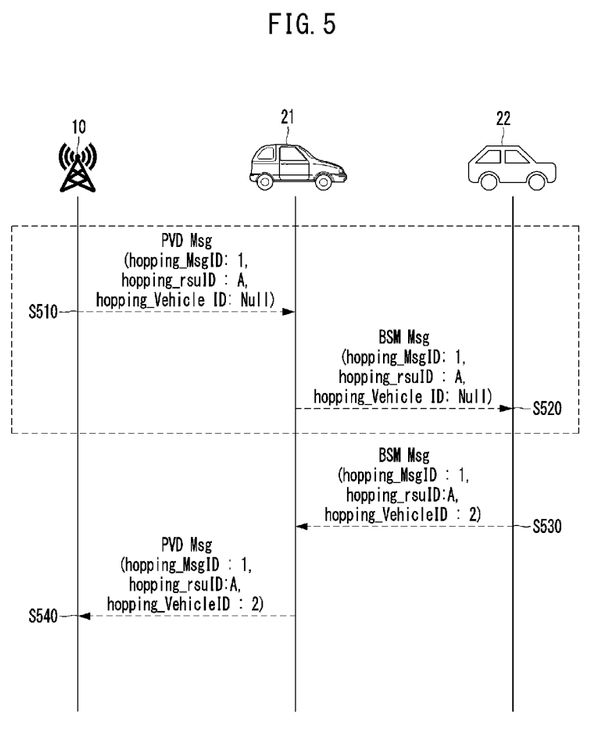
FIG. 5 is a flowchart of a communication method using the message specification of FIG. 4.

FIG. 5 is a flowchart of a communication method using the message specification of FIG. 4. FIG. 5 illustrates an example of a communication process of the communication method according to the present embodiment.

Referring to FIG. 5, an RSU 10 may transmit a first PVD message Msg to a first vehicle 21 (S510). Operation S510 may be a process of broadcasting, by the RSU 10, the first PVD message Msg to the first vehicle 21, which is a nearby vehicle in the communication possible area, when the RSU 10 needs information about a second vehicle 22 located in the communication possible area. The RSU 10 may transmit a message (hereinafter referred to as a 'new message') requesting information about the second vehicle 22 located in the communication impossible area to the first vehicle 21. In this case, the RSU 10 may include a DF DF_hoppingRequest of a hopping request message in a PVD message, which is defined in the SAE J2735 standard, as the new message, and broadcast the new message to the first vehicle 21.

Next, the first vehicle 21 may transmit a first BSM message to the second vehicle 22 (S520). Operation S520 may be a process in which the first vehicle 21 extracts a hopping request message from the first PVD message received from the RSU 10 and includes the hopping request message in the BSM message and broadcasts the BSM message to the second vehicle 22. The hopping request message may include at least one DE for various types of information provided by a message transmitter to obtain desired information.

The at least one DE may include a hopping vehicle ID hopping_VehicleID representing an identifier of a vehicle driving through a communication impossible area, a hopping message ID hopping_MsgID representing a message identification value, a hopping time stamp hopping_Timestamp representing a time stamp value, a hopping latitude hopping_latitude representing the latitude of the second vehicle, a hopping longitude hopping_longitude representing the longitude of the second vehicle, a hopping elevation hopping_Elevation representing the elevation of the second vehicle, a hopping vehicle accident hopping_DriveAccident representing accident information of a shaded zone, a hopping RSU ID hopping_rsuID representing a hopping identification value for requesting information about the second vehicle, etc.

Next, the second vehicle 22 may transmit a second BSM message to the first vehicle 21 (S530). Operation S530 may be a process in which the second vehicle 22 broadcasts the second BSM message, including a requested information value of the hopping request message received from the first vehicle 21, to the first vehicle 21.

Thereafter, the first vehicle 21 may transmit a second PVD message to the RSU 10 (S540). Operation S540 may be a process in which the first vehicle 21 includes either the hopping request message received from the second vehicle 22 or vehicle information included in the hopping request message received from the second vehicle 22 in the second PVD message and broadcasts the second PVD message to the RSU 10. The hopping request message included in the second PVD message includes second vehicle information included in the second BSM message and RSU information of the hopping request message included in the first PVD message.

As described above, the first vehicle 21 may identify the RSU 10 requesting the second vehicle information through a hopping RSU ID hopping_rsuID, a hopping vehicle ID hopping_VehicleID, and a hopping message ID hopping_MsgID, and relay message hop-based communication between the second vehicle 22 and the RSU 10.

The first PVD message and the second PVD message between the RSU 10 and the first vehicle 21 may be transmitted in a broadcast manner through the IEEE 802.11p interface or the IEEE 802.11g interface. Similarly, the first BSM message and the second BSM message between the first vehicle 21 and the second vehicle 22 may be transmitted in the broadcast manner through the IEEE 802.11p interface or the IEEE 802.11g interface.

For real-time communication for connection of V2I and V2V described above, DEs defined in a hopping request message are summarized as follows.

First, the first PVD message may include information in which a DE value of the hopping message ID hopping_MsgID is set to 1, a DE value of the hopping RSU ID hopping_rsuID is set to A, and a DE value of the hopping vehicle ID hopping_VehicleID is set to null.

Here, the element value '1' of the hopping message ID hopping_MsgID is information identifying a message and may be information identifying a driving negotiation session. The element value 'A' of the hopping RSU ID hopping_rsuID may be an identifier of the RSU 10 or information corresponding to the identifier.

The first BSM message may include information in which the DE value of the hopping message ID hopping_MsgID is set to 1, the DE value of the hopping RSU ID hopping_rsuID is set to A, and the DE value of the hopping vehicle ID hopping_VehicleID is set to null. The second BSM message may include information in which the DE value of the hopping message ID hopping_MsgID is set to 1, the DE value of the hopping RSU ID hopping_rsuID is set to A, and a DE value of the hopping vehicle ID hopping_VehicleID is set to 2.

Here, the element value '2' of the hopping vehicle ID hopping_VehicleID may be a second identifier of the second vehicle 22, which is a source or origin of the second BSM message, or information corresponding to the second identifier.

The second PVD message may include information in which the DE value of the hopping message ID hopping_MsgID is set to 1, the DE value of the hopping RSU ID hopping_rsuID is set to A, and a DE value of the hopping vehicle ID hopping_VehicleID is set to 2.

Meanwhile, a DF of the hopping request message may further include a DE for setting information indicating a hopping message, and a DE for setting a first identifier of the first vehicle 21, which is a destination of the second PVD message, or information corresponding to the first identifier.

According to the configuration of the present embodiment, a driving negotiation session may be identified by the hopping message ID hopping_MsgID. The first vehicle 21 may check PVD information received from the RSU 10, store a hopping request message included in the PVD information, and transmit the hopping request message as a BSM message to the second vehicle 22. In this case, the second vehicle 22 may be located in a communication impossible area. Thereafter, the second vehicle 22 may transmit negotiation information defined in the hopping request message to the first vehicle 21. The first vehicle 21 may transmit the negotiation information received from the second vehicle 22 to the RSU 10. As described above, transmitters and receivers in V2I and V2V communication may identify each other through the RSU ID hopping_rsuID and the hopping vehicle ID hopping_VehicleID and identify a session through the hopping message ID hopping_MsgID to perform real-time communication.

Figure 6:
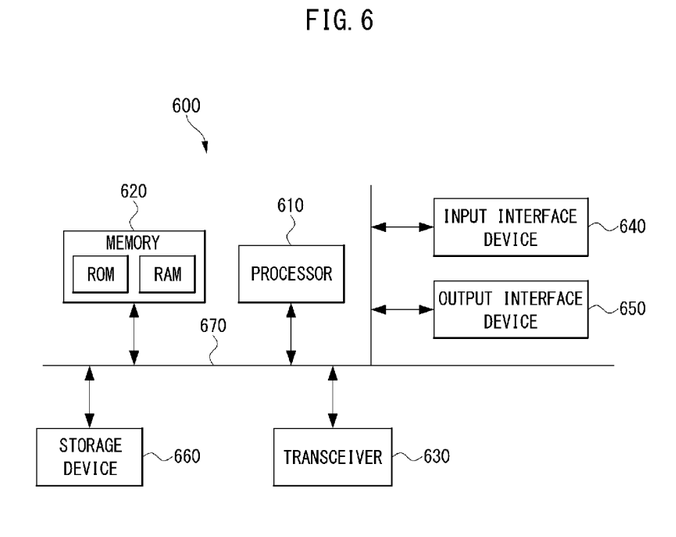
FIG. 6 is a schematic block diagram of a message hop-based communication apparatus for guaranteeing real-time communication in an autonomous driving environment according to another embodiment of the present disclosure.

FIG. 6 is a schematic block diagram of a message hop-based communication apparatus (hereinafter referred briefly to as a 'communication node') for guaranteeing real-time communication in an autonomous driving environment according to another embodiment of the present disclosure.

Referring to FIG. 6, a communication node 600 may include at least one processor 1100 configured to implement a message hop-based communication method of guaranteeing real-time communication in an autonomous driving environment. The at least one processor 610 may be mounted on a base station, a RSU, a vehicle, an autonomous vehicle, or a vehicle or an autonomous vehicle located in a communication impossible area.

The communication node 600 may further include a memory 620, a transceiver 630, an input interface device 640, an output interface device 650, a storage device 660, or a combination thereof. The components included in the communication node 600 may be connected to one another through a bus 670 to communicate with one another.

Alternatively, the components included in the communication node 600 may be connected through individual interfaces or buses centered on the at least one processor 610, rather than a common bus 670. For example, the at least one processor 610 may be connected to at least one of the memory 620, the transceiver 630, the input interface device 640, the output interface device 650, or the storage device 660 through a dedicated interface.

The at least one processor 610 may be understood as a central processing unit (CPU), a graphics processing unit (GPU), or a dedicated processor configured to perform methods according to embodiments of the present disclosure.

Each of the memory 620 and the storage device 660 may include at least one of a volatile storage medium or a nonvolatile storage medium. For example, the memory 620 may include at least one of a read-only memory (ROM) or a random access memory (RAM).

The transceiver 630 may include at least one or more sub-communication systems that support wireless communication, mobile communication, or satellite communication to exchange signals and data with other communication nodes through a network. The other communication nodes may include a base station, an RSU, a vehicle, an autonomous vehicle, a connected car, and the like.

Here, the network may include a network that supports device-to-device (D2D) communication, side link communication, new radio (NR) vehicular to everything (V2X) communication, and the like. In addition, the network may include any communication network that can be formed between a specific service server in a core network or an edge network and an on-board unit or a vehicle, in which the on-board unit is mounted, connected through a mobile communication network, a wireless communication network, a satellite network, or a combination thereof. The vehicle may include an autonomous vehicle.

The input interface device 640 may include at least one input means selected from among a keyboard, a microphone, a touchpad, a touch screen, a remote control means, etc., and an input signal processor that maps or a signal input through the at least one input means to a stored instruction or processes the input signal.

The output interface device 650 may include an output signal processor that maps or processes an output signal in the form of a pre-stored signal or according to a level under control of the processor 610, and at least one output means that outputs a signal or information in the form of vibration, light, sound, heat or the like according to a signal from the output signal processor. The at least one output means may include at least one selected from among output means such as a speaker, a display device, a printer, a light output device, and a vibration output device.

The processor 610 may execute a program command or a software module with the program command, which is stored in at least one of the memory 620 or the storage device 660. That is, the processor 610 may be configured to perform a message hop-based communication method as shown in FIG. 5 when the processor 610 is executed by the program command. The operations of the message hop-based communication method may be performed by at least one of an RSU, a first vehicle, or a second vehicle.

According to the present disclosure, communication based on a hopping method is used to provide a real-time environment in which information about traffic situations, events or accidents occurring in areas in which communication cannot be established with a base station or an RSU can be shared between vehicles or with the RSU or a central traffic center.

According to the present disclosure, it is possible to provide a negotiation process of establishing communication in real time even in communication impossible areas by actively using V2V communication while using a message specification for sharing the V2V communication with an RSU.

In addition, according to the present disclosure, a message hop-based real-time communication in an autonomous driving environment can be guaranteed using V2V communication actively while using a message specification for sharing the V2V communication with an RSU. For example, in relation to sensor sharing, information about an event can be effectively transmitted to or shared with a vehicle located in a communication impossible area in which an event sensed by a vehicle in front of the vehicle cannot be detected, thereby preventing the occurrence of a secondary accident that may additionally occur due to a failure to receive accident information.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A message hop-based communication method of guaranteeing real-time communication in a vehicle communication environment, comprising:
   receiving, by a first on-board unit (OBU) of a first vehicle, a first message including a message frame (MF) for probe vehicle data (PVD) from a road side unit (RSU); and
   transmitting a second message, including an MF for a basic safety message (BSM), to a second OBU of a second vehicle, the second message corresponding to the first message,
   wherein the PVD and the BSM each comprise a data frame for a hopping request, and
   wherein the BSM further comprises a data frame for a full position vector (FullPositionVector).

2. The message hop-based communication method of claim 1, wherein the data frame for the hopping request comprises a data element for a hopping RSU identifier (ID) and a data element for a hopping vehicle ID,
   wherein the hopping RSU ID and the hopping vehicle ID are used to identify a message transmitter and a message receiver.

3. The message hop-based communication method of claim 2, wherein the data frame for the hopping request further comprises a data element for a hopping message ID, wherein the hopping message ID is used to identify a message transmitted between the message transmitter and the message receiver or a driving negotiation session corresponding to the message.

4. The message hop-based communication method of claim 3, wherein the data frame for the hopping request further comprises at least one among data elements for a hopping traffic accident (hopping_DriveAccident), a hopping time stamp (hopping_timestamp), a hopping longitude (hopping_Longitude), a hopping latitude (hopping_Latitude), a hopping elevation (hopping_Elevation), and a hopping positional accuracy (hopping_positionalAccuracy).

5. The message hop-based communication method of claim 1, wherein the first message or the second message is transmitted through an IEEE 802.11p interface or an IEEE 802.11g interface.

6. The message hop-based communication method of claim 1, wherein the PVD further comprises a date frame for BSM core data (BSMCoreData).

7. A message hop-based communication apparatus of a first communication node for performing message hop-based communication in a vehicle communication environment, comprising:
a memory storing specifications for a message frame, a data frame included in the message frame, and data elements included in the data frame; and
a processor connected to the memory and configured to control transmission and reception of messages according to the specifications,
wherein the processor is further configured to:
receive a first message including, a message frame for probe vehicle data (ProbeVehicleData (PVD)) from a road side unit (RSU); and
transmit a second message, including a message frame for a basic safety message (BSM), to a second communication node, the second message corresponding to the first message,
wherein the PVD and the BSM each comprise a data frame for a hopping request, and
wherein the BSM further comprises a data frame for a full position vector FullPositionVector).

8. The message hop-based communication apparatus of claim 7, wherein the first communication node is located near the second communication node and is at least a part of a first vehicle located in an area in which communication is capable of being established with the RSU, and the second communication node is at least a part of a second vehicle located in an area in which communication is not capable of being established with the RSU.

9. The message hop-based communication apparatus of claim 8, wherein the first message is broadcast from the RSU to the first vehicle to check information about the second vehicle.

10. The message hop-based communication apparatus of claim 9, wherein the second message comprises a hopping request message extracted from the first message.

11. The message hop-based communication apparatus of claim 10, wherein the processor is further configured to receive, from the second communication node, a third message in which a requested information value of the hopping request message in the second message is included by the second communication node.

12. The message hop-based communication apparatus of claim 11, wherein the processor is further configured to transmit a fourth message including the hopping request message extracted from the third message to the RSU.

13. The message hop-based communication apparatus of claim 12, wherein the fourth message comprises a data element including information identifying the RSU, which is a transmitter of the first message, a data element including information identifying either the second communication node, which is a receiver of the second message, or a second vehicle corresponding to the second communication node, and a data element including information identifying either a message between the RSU and the second communication node or a driving negotiation session.

14. The message hop-based communication apparatus of claim 9, wherein the first message comprises information in which a data element value of a message ID (MsgID) in a hopping request message is set to a first specific value, a data element value of an RSU ID (rsuID) is set to a second specific value, and a data element value of a vehicle ID is set to null.

15. A message hop-based communication method of a first communication node for guaranteeing message hop-based real-time communication in a vehicle communication environment, comprising:
receiving a first message including a message frame for probe vehicle data (ProbeVehicleData (PVD)) from a road side unit (RSU); and
transmitting a second message, including a message frame for a basic safety message (BSM), to a second communication node, the second message corresponding to the first message,
wherein the PVD and the BSM each comprise a data frame for a hopping request, and
wherein the BSM further comprises a data frame for a full position vector (FullPositionVector).

16. The message hop-based communication method of claim 15, wherein the first message is a message broadcast from the RSU to the first communication node to check information about the second communication node, and
the second message comprises a hopping request message extracted from the first message.

17. The message hop-based communication method of claim 16, further comprising receiving, from the second communication node, a third message in which a requested information value of the hopping request message in the second message is included by the second communication node.

18. The message hop-based communication method of claim 17, further comprising transmitting a fourth message including a hopping request message extracted from the third message to the RSU, and
wherein the fourth message comprises a data element including information identifying the RSU, which is a transmitter of the first message, a data element including information identifying either the second communication node, which is a receiver of the second message, or a second vehicle corresponding to the second communication node, and a data element including information identifying either a message between the RSU and the second communication node or a driving negotiation session.

19. The message hop-based communication method of claim 15, wherein the first communication node is located near the second communication node and is at least a part of a first vehicle located in an area in which communication is capable of being established with the RSU, and the second communication node is at least a part of a second vehicle located in an area in which communication is not capable of being established with the RSU.

* * * * *